United States Patent

[11] 3,580,687

| [72] | Inventor | Siegfried Hansen<br>Los Angeles, Calif. |
|---|---|---|
| [21] | Appl. No. | 800,970 |
| [22] | Filed | Feb. 20, 1969 |
| [45] | Patented | May 25, 1971 |
| [73] | Assignee | Hughes Aircraft Company<br>Culver City, Calif. |

[54] SURVEY LEVEL
8 Claims, 10 Drawing Figs.
[52] U.S. Cl.................................................... 356/248,
356/254, 356/255
[51] Int. Cl. ..................................................... G01c 9/24
[50] Field of Search.......................................... 356/248,
250, 253, 254, 255, 249; 33/73 (D)

[56] References Cited
UNITED STATES PATENTS
| 2,386,621 | 10/1945 | Luboshez..................... | 356/250 |
| 3,409,993 | 11/1968 | Hansen......................... | 356/250 |

*Primary Examiner*—Ronald L. Wibert
*Assistant Examiner*—T. Major
*Attorneys*—James K. Haskell and Allen A. Dicke, Jr.

ABSTRACT: As level reference, the survey level incorporates an optical flat equipped with a leveling servo so that the optical flat is maintained accurately perpendicular to the direction of local gravity. Optics include an image rotating prism and a beam splitter arranged so that light from a target is split, part of it is reflected from the horizontal surface of the optical flat and the images are compared. When they horizontally correspond, the target is in the horizontal survey level reference plane. When the target is off that plane, two vertically displaced images are seen.

Siegfried Hansen,
INVENTOR.
BY.

ALLEN A. DICKE, Jr.,
AGENT.

Target Low

Target Horizontal

Target High

SURVEY LEVEL

BACKGROUND

In order to aid in the understanding of this invention it can be stated in essentially summary form that it is directed to a survey level by which the vertical displacement of a target from a horizontal reference plane can be detected.

Prior instruments for survey leveling included the prior art survey level which is leveled by employment of a curved tube or convex glass to guide the motion of a bubble. Such a bubble level indicates the level position in terms of the rest position of the bubble as read from marks on the curved tube or convex glass. Even with a large radius of curvature, such levels were relatively insensitive as compared to the employment of a flat surface to restrain the bubble, instead of the curved guiding surface. In addition, the telescope axis must lie in a reference plane which is perpendicular to local direction of gravity as established by the curved bubble level. Any error in telescope axis with respect to this plane yields additional inaccuracy. Such inaccuracies lead to inaccuracies in survey leveling with conventional instruments.

SUMMARY

In order to aid in the understanding of this invention, it can be stated in essentially summary form that it is directed to a survey level. The survey level comprises a flat reference surface which is maintained perpendicular to the local direction of gravity by means of tilt detection and servo releveling of the surface. Optics comprised of prisms and including a beam splitter receive an incoming light ray from the target, split it and reflect a portion off of the level surface so that two images can be compared to determine whether or not the target is on the horizontal reference plane of the level.

Accordingly, it is an object of this invention to provide a survey level which employs a servo-leveled reference surface. It is another object to employ a survey level wherein tilt of the reference surface is detected by means of a bubble beneath the surface. It is a further object to provide a survey level wherein the reference surface is parallel to its flat lower surface and a bubble is positioned thereunder so that bubble velocity indicates the amount of tilt. It is another object to provide bubble velocity detecting structure and reference surface releveling structure so that the reference surface is releveled when the bubble moves beneath the reference surface. It is another object to provide an optical system comprised of an image-rotating device so that light from a target is rotated and is reflected off the reference surface to provide a level reference. It is a further object to include a beam splitter within the optics whereby a portion of the light from the target is reflected off of the horizontal reference surface and is also viewed in the telescope so that the two images can be compared to determine whether or not the target is on the horizontal reference plane of the survey level. It is a further object to provide a survey level with optics including a beam splitter so that part of the light from the target is reflected an even number of times while another part is reflected an odd number of times. It is still another object to provide a survey level having a rotating prism separate from the telescope structure so that the survey level can level with respect to reference planes which are separate from and adjustable with respect to the telescope axis and the beam splitter axis.

Other objects and advantages of this invention will become apparent from a study of the following portion of the specification, the claims and the attached drawings.

DESCRIPTION

Figure 7:
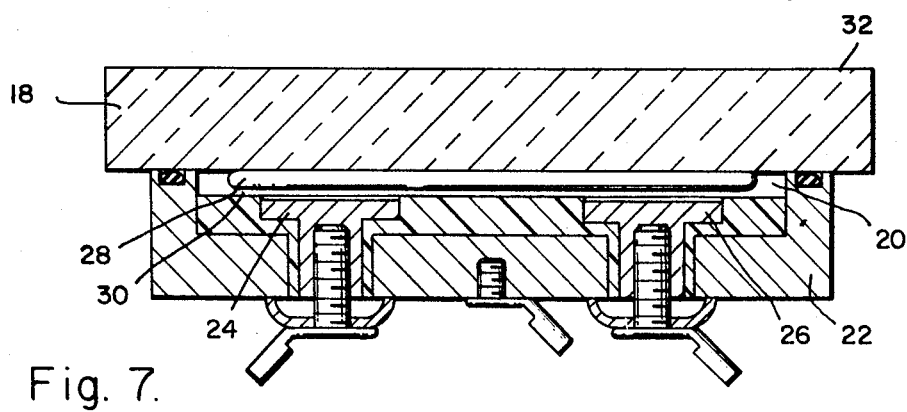
FIG. 7 is a vertical section taken through the center of the horizontal reference structure including the bubble on its under side and the bubble motion-detecting electrodes.

Siegfried Hansen U.S. Pat. No. 3,409,993, granted Nov. 12, 1968, describes a Precision Tilt Meter. The tilt meter has a cover plate having a flat undersurface. Beneath the cover plate is a bubble in a liquid, with electrodes in the bubble chamber which determine bubble motion. The bubble is principally constrained by the viscous forces of the liquid so that upon tilt, bubble velocity, in its chamber is proportional to tilt, at small tilt angles. The time integral of tilt is bubble displacement. Electrical coupling of bubble position causes the electrodes to emit signals which can be employed to relevel the cover plate through use of suitable servo mechanism. Such a tilt meter is indicated at 10 in FIG. 1A, 2A and 3A. The tilt meter 10 serves as an integral part of the three embodiments 12, 14 and 16 of the survey level of this invention. As is seen in Fig. 7, the tilt meter has a cover plate 18 beneath which a bubble chamber 20 is formed by means of bubble housing 22. The bottom of the bubble chamber is insulated and carries 4 orthogonally arranged electrodes, two of which are shown at 24 and 26. Bubble 28 is formed in liquid 30 in the bubble chamber. Electrodes 24 and 26, together with the other pair of electrodes, are connected to a suitable servomechanism which relevels the undersurface of cover plate 18 to return the cover plate to such an attitude that bubble 28 is stationary. In that position, the under side of cover plate 18 is perpendicular to the local direction of gravity. For further details with respect to the entire tilt meter 10 structure and its servo releveling, attention is called to Hansen U.S. Pat. No. 3,409,993, the entire disclosure of which is incorporated herein by this reference.

For employment of the tilt meter within a survey level as a horizontal reference, cover plate 18 is formed so that its top surface 32 is flat and parallel within the closest available tolerances with respect to the bottom surface thereof. Additionally, top surface 32 is mirrored so as to be totally reflecting.

Figure 1A:
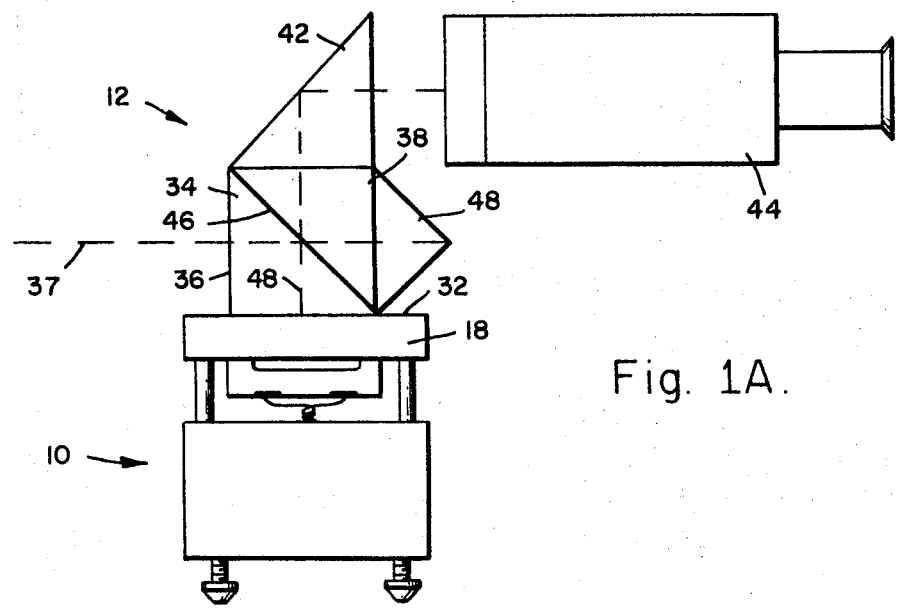
FIG. 1A is a schematic side elevational view of the preferred embodiment of the survey level of this invention.
Figure 1B:
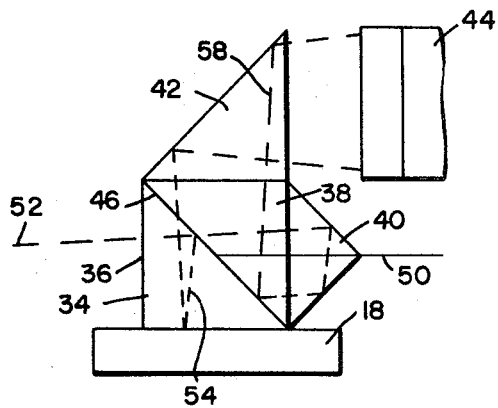
FIG. 1B is a similar view, showing only the optical elements, and illustrating their optical relationship.

Referring to FIG. 1A and 1B, mounted on the top surface 32 is objective prism 34. Its front surface 36 receives light from a target along beam 37 when the target is on the horizontal reference plane of survey level 12. Objective prism 34 is a standard 45°—45°—90° reflecting prism and has its bottom surface lying against the mirrored top surface 32. All other prisms are of this type, except where otherwise noted. Lying against the rear surface of objective prism 34 with their hypotenuses together, is prism 38. The common surfaces of prisms 34 and 38 are arranged so that these two prisms act as a beam splitter. Such is accomplished by suitable coating of the interface surfaces, such as partial aluminizing and cementing of the prisms together with lens cement.

The rear surface of prism 38 carries Porro prism 40 and the top surface carries reflecting prism 42. Telescope 44 is arranged so that its optical axis lies substantially parallel to the beam 37 received from a target which is on the reference plane of survey level 12, although axial alignment of telescope 44 is not necessary for accuracy of the survey level.

FIG. 1A schematically illustrates the optical condition when the target viewed is on the same plane as the reference plane of the survey level, as illustrated by light ray 37. Ray 37 enters the front surface of prism 34 and strikes the beam splitter surface 46. Part of the ray is reflected downward along path 48 to reflect off of top surface 32 where it thereupon passes through the beam splitter surface 46 and reflects off of the back of reflecting prism 42 into telescope 44 to form an image. The balance of ray 36 passes straight through beam splitter surface 46 and reflects in Porro prism 48. When ray 37 is in horizontal plane, parallel to top surface 32, passing through the apex of Porro prism 48, the light is reflected back along the same path as the incident ray. When it reaches beam splitter surface 46 it is reflected upward and joins path 48 to reinforce the image seen in telescope 44. This is the image seen in FIG. 5. Thus, the reference plane of survey level 12 is a horizontal plane passing through the apex of Porro prism 40. Such a plane is illustrated at 50 in FIG. 1B.

Figure 6:
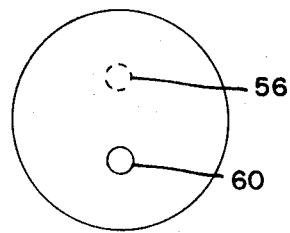
FIG. 6 is the view through the survey level of FIG. 1A and 1B when the target is below the reference plane.

FIG. 1B illustrates a condition wherein ray 52 from the target does not lie in the plane 50, but is angularly aligned with respect thereto. It is illustrated as being angularly below the reference plane. In this case, the ray enters objective prism 34 and is partially reflected on beam splitter surface 46. Part of the light passes downward along path 54 and thence is reflected upward to the reflecting surface of prism 42 and into telescope 44. It forms an image 56, see FIG. 4. The balance of ray 52 passes through beam splitter surface 46, reflects in Porro prism 40 and returns to the beam splitter surface 46 to be reflected upward along path 58. It is then reflected in prism 42 into telescope 44 to form an image 60, see FIG. 4. Thus, the presence of vertically displaced images indicates that the target is not on the reference plane 50 which is a horizontal plane. FIG. 6 illustrates the view seen in the telescope 44 when the target is low. When the condition of the target being out of the horizontal reference plane is viewed by the survey level operator, he signals the target operator to move the target to bring the images into horizontal alignment as seen in the telescope. When it is so positioned, the target lies in the horizontal reference plane 50.

Two images are seen in the telescope because, through beam splitting, one ray is reflected an even number of times while the other is reflected an odd number of times. Thus, the output ray reflected an even number of times is directly angularly related to the incoming ray and the output ray reflected an odd number of times is oppositely angularly related to the incoming ray when the incoming ray is rotated.

In the structure of FIGS. 1A and 1B, since the objective prism 34 is directly mounted on the top surface of cover plate 18, it can serve as a 90° beam rotator. Since its bottom surface is horizontal because it is mounted upon the cover plate, ray 37 is horizontal within the limits of accuracy of the prism 34 and the horizontal state of top surface 32. Both of these are highly accurate in the structure of FIGS. 1A and 1B so that ray 37 lies in a horizontal plane within an accuracy of one order of magnitude better than conventional survey levels.

Figure 2A:
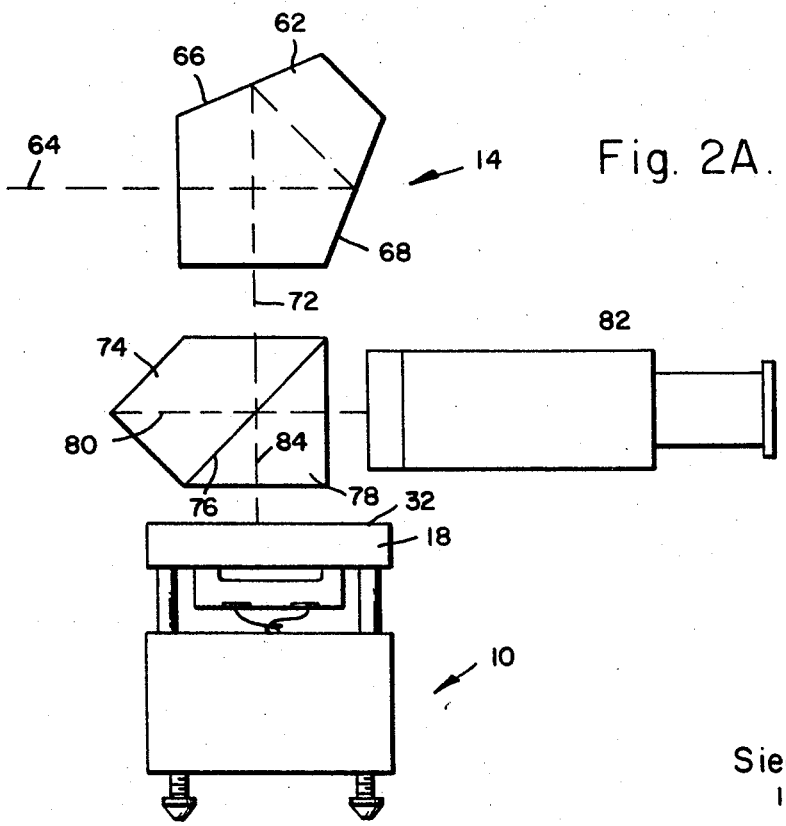
FIG. 2A is a view similar to FIG. 1A showing another embodiment thereof.
Figure 2B:
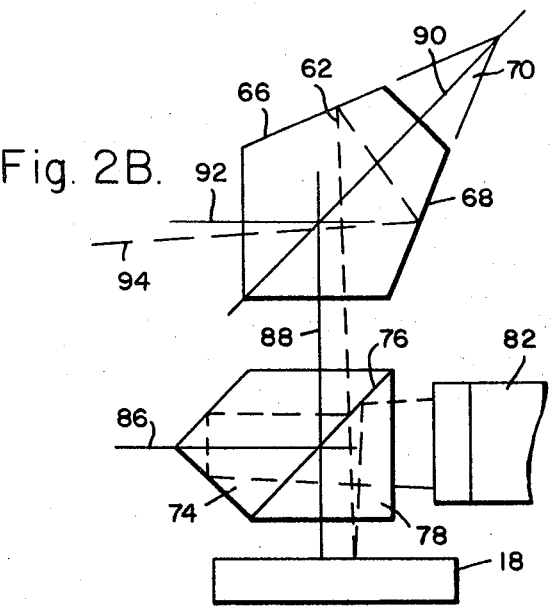
FIG. 2B is a view similar to FIG. 1B, illustrating the optical relationship of the structure of FIG. 2A.

The structure of FIGS. 2A and 2B is similar, but in view of the fact that the prismatic elements are not mounted upon cover plate 18 of tilt meter 10, a different beam rotating structure is required. Referring to these figures, pentaprism 62 receives ray 64 from the target. Pentaprism 62 is conventional and it has surfaces 66 and 68 which have a total included back angle 70 of 45°. Surfaces 66 and 68 are conventionally silvered because of the high angle of incidence. Pentaprism 62 rotates ray 64 by 90° to produce downwardly directed ray 72. Ray 72 enters prism 74 which is a four-sided prism. The left portion acts as a Porro prism, identical to prism 48 and the right portion acts as half of the beam splitter, identical to prism 38. Interface 76 between prism 74 and prism 78 is suitably treated to act as a beam splitter. A first portion of the ray 72 is refracted at interface 76 to form ray 80 which is reflected in the Porro prism section and passes back through interface 76 into telescope 82 to form a first image. Another portion of ray 72 passes through beam-splitting interface 76 to form ray 84 which is reflected off of the top surface 32 of cover plate 18. This reflected ray is reflected at interface 76 into telescope 82. In the condition shown in FIG. 2A, where the ray 64 is from a target lying on the horizontal reference plane, the two images are seen in horizontal alignment in telescope 82. Such alignment of the images indicates that condition, similarly to the earlier described structure.

Referring to FIG. 2B, the light construction lines thereon indicate the manner in which the horizontal reference plane is defined. Bisector plane 86 bisects the rear angle of the Porro prism portion of prism 74. Where bisector plane 86 intersects interface 76, plane 88 extends upward normal to top surface 32. Bisector plane 90 bisects the back angle 70 of pentaprism 62, and horizontal reference plane 92 is defined by the intersection of planes 88 and 90. Thus, since ray 64 lies in plane 92 a horizontal target is indicated.

FIG. 2B also illustrates the optical paths when the target emits ray 94 below reference plane 92. Ray 94 is rotated 90° internally of pentaprism 62. The downwardly directed ray is split at interface 76 with a portion reflected in the Porro prism section to enter telescope 82 to produce a low image. The balance of the downwardly directed ray passes through interface 76, is reflected off of the top surface 32 of cover plate 18 and is reflected off the interface 76 to provide a high image in the telescope. Thus, separation of the images seen in the telescope indicates that the target is not upon the horizontal reference plane. Again it is seen that a portion of the incoming ray is reflected an even number of times and the balance an odd number of times.

With respect to the optics of FIGS. 2A and 2B, it is clear that the rotation of pentaprism 62 will not affect the separation of the images, and will not affect the horizontal condition of reference plane 92. Thus, if desired, pentaprism 62 can be separately supported from the remainder of the optics. Its beam rotation characteristics are not affected by minor angular errors of position of the pentaprism.

Similarly, the combination beam splitter and Porro prism comprised of prisms 74 and 78 need not be accurately or horizontally positioned. The beam splitter-Porro prism structure can be conveniently mounted on the front of the telescope so that the tilt meter 10 can be independently supported. For example, the tilt meter 10 can be placed on the ground to level itself so that its mounting is separate from the mounting of the remainder of the optical element to prevent perturbations of the tilt meter level characteristics. Prisms 74 and 78 are optically identical to prisms 36, 38 and 48. Thus, three prisms can be alternatively employed to the two prisms 74 and 78.

Figure 3B:
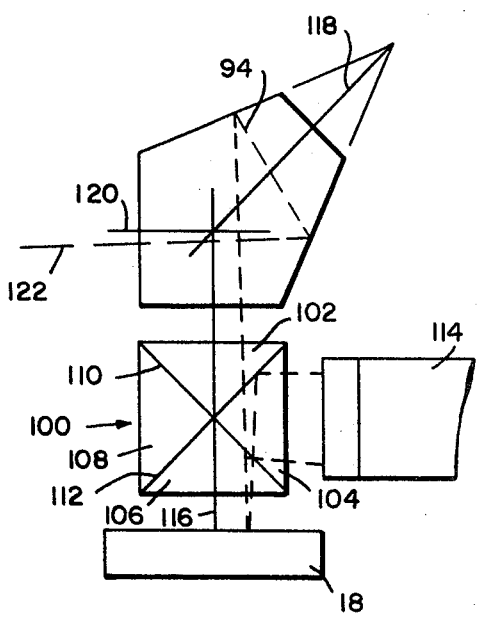
FIG. 3B is a view similar to FIG. 1B, showing the optical relationship of the structure of FIG. 3A.
Figure 3A:
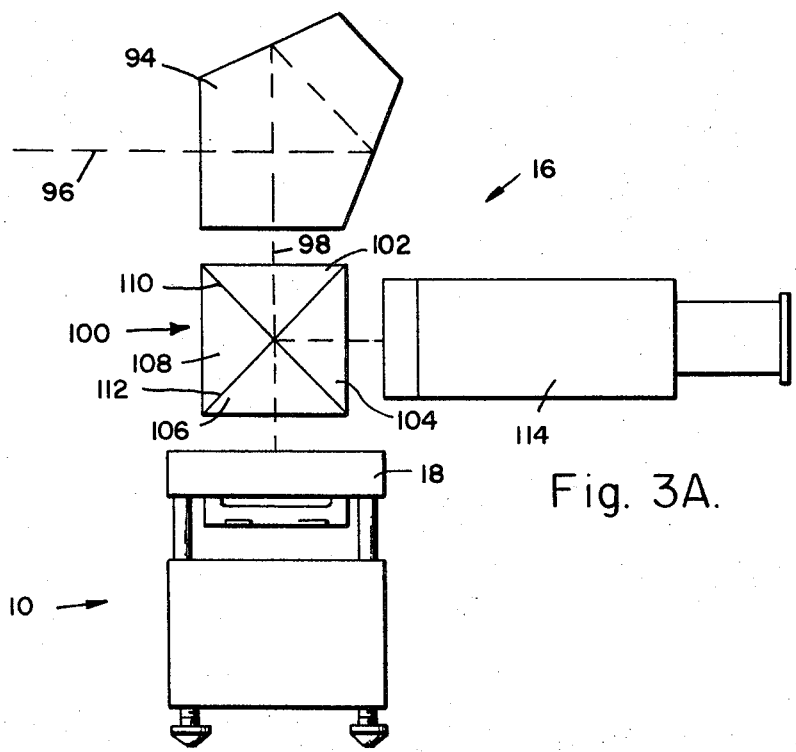
FIG. 3A is a view similar to FIG. 1A, of a further embodiment of the invention.

Referring to FIGS. 3A and 3B, survey level 16 is seen therein. Survey level 16 is similar to survey level 14 but employs a double beam splitter instead of a beam splitter and a Porro prism. Pentaprism 94 is identical to pentaprism 62. It receives a light ray 96 from a target which lies on the horizontal reference plane and rotates the ray 90° along path 98.

Figure 5:
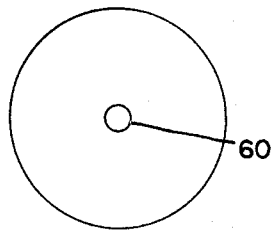
FIG. 5 is a view seen through the survey level of FIG. 1A and 1B when the target is on the horizontal reference plane.

Double beam splitter 100 receives ray light 98 and is comprised of four identical prisms 102, 104, 106 and 108. Each of these prisms has the conventional 45°—45°—90° prism. Their apices are placed together to define interfaces 110 and 112 which lie at 90° with respect to each other. These interfaces are suitably treated to act as beam splitters. As is seen in FIG. 3A, a portion of the ray 98 is reflected at beam splitter interface 110 into telescope 114. The balance passes through the beam splitter interface, as reflected off of the top surface of cover plate 18 and is thence reflected off of beam splitter interface 112 into telescope 114. In this condition, the two images are in horizontal alignment to show that the target is upon the horizontal reference plane, as is seen in FIG. 5.

FIG. 3B illustrates the manner in which the horizontal reference plane is defined. Plane 116 is normal to the top surface 32 of cover plate 18 and passes through the intersection of beam splitter interfaces 110 and 112. It intersects bisector plane 118 which bisects the back angle of pentaprism 94. Horizontal reference plane 120 passes through the intersection of planes 116 and 118.

Figure 4:
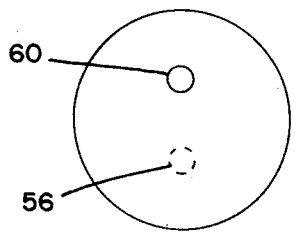
FIG. 4 is the view seen through the survey level of FIG. 1A and 1B when the target is above the reference plane.

As an example of an off-level condition, ray 122 enters pentaprism 94 and it is rotated thereby to produce a downwardly directed ray. A portion of the ray is reflected on beam splitter interface 110 into telescope 114. The balance passes downwardly. It is reflected off of the top surface of cover plate 118 back up to beam splitter interface 112. At that position, it is reflected into telescope 114 to form a second image in the telescope. The displacement of these images, as is seen in FIG. 4, indicates that the target is below horizontal reference plane 120. It is to be noted that part of the incoming ray is reflected an even number of times and a portion is reflected an odd number of times.

Rotation of pentaprism 94 or double beam splitter 100 does not affect the separation of the images or the position of horizontal reference plane 120. If desired, the four elements shown in FIGS. 3A and 3B can be mounted together, or may be separated as shown. Separation of the tilt meter 10 is preferable so that it may independently maintain its level condition without perturbation. On the other hand, the three remaining elements can be combined in one mounting or may be separated. In some conditions, the separation of pentaprism 94 is desirable because it permits establishment of horizontal reference plane 120 at a height independent of the telescope height.

In each of the three embodiments of the survey level, the tilt meter establishes a horizontal plane, and in rotating means rotates the image 90° so that reflection from the tilt meter surface establishes a horizontal reference plane. A beam splitter is employed to permit comparison of images to determine the target position with respect to the horizontal reference plane.

In the structures of FIGS. 1A, 1B, 2A and 2B, making the back angle of the Porro prism different than 90° produces useful results. If the angle is about 10 arc seconds off of 90° two images at a fixed distance apart are seen in the telescope as a result of the ray through the Porro prism. This permits the image reflected off of the tilt meter to be centered between the reference images for greater accuracy. The same double image can be produced in the survey level of FIGS. 3A and 3B by angulating the ends of plane 110 on opposite sides of plane 112 with respect to each other.

This invention having been described in its preferred embodiment, and additional embodiments disclosed, it is clear that it is susceptible to numerous modifications and embodiments within the ability of those skilled in the art and without the exercise of the inventive faculty. Accordingly, the scope of this invention is defined by the scope of the following claims.

What I claimed is:

1. A survey level, said survey level comprising:
   level means including a reflective horizontal surface comprising a horizontal reference surface,
   said horizontal reference surface comprising a horizontal mirrored surface having a bubble therebeneath, leveling means connected to level said horizontal reference surface and a bubble-detecting means connected to said leveling means to relevel said horizontal reference surface when said bubble-detecting means indicates said horizontal reference surface is away from the horizontal position;
   optical means including an optical beam-rotating prism and an optical beam splitter, said optical means rotating an incoming light ray to direct the light ray toward said horizontal reference surface and said beam-splitting means splitting the light ray to form two images when the incoming light ray is away from a horizontal reference plane, one of said images being reflected by an even number of surfaces and the other image being reflected by an odd number of surfaces in said survey level.

2. The survey level of claim 1 wherein said horizontal reference surface comprises a plate having substantially planar and parallel upper and lower surfaces, said upper surface being said horizontal reflecting surface and said lower surface being engaged by said bubble, said bubble-detecting means and said surface-releveling means responding to bubble velocity.

3. A survey level, said survey level comprising:
   optical means and level reference means;
   said level reference means comprising a horizontal reflective surface;
   said optical means including first and second prisms having a beam-splitting interface, said first prism receiving an incoming light ray and being mounted upon said level reference means, a Porro prism mounted against said second beam-splitting prism to return a light ray passing through said beam-splitting interface to said interface to produce two images when the incoming light ray is away from a horizontal reference plate.

4. The survey level of claim 3 wherein one of the images is reflected by an even number of surfaces and the other image is reflected by an odd number of surfaces in said survey level.

5. The survey level of claim 4 wherein the horizontal reference plane is parallel to said reflective plate and passes through the apex of said Porro prism.

6. The survey level of claim 5 wherein said optical means further includes a prism mounted with respect to said second prism to rotate rays interacting with said beam-splitting interface, and a telescope to receive the rotated beams.

7. A survey level, said survey level comprising:
   level means including a reflective horizontal surface comprising a horizontal reference surface, said horizontal reference surface comprising a horizontal mirrored surface having a bubble therebeneath, leveling means connected to level said horizontal reference surface and a bubble-detecting means connected to said leveling means to relevel said horizontal reference surface when said bubble-detecting means indicates said horizontal reference surface is away from the horizontal position;
   optical means including an optical beam-rotating prism and an optical beam splitter, said optical means rotating an incoming light ray to direct the light ray toward said horizontal reference surface and said beam-splitting means splitting the light ray to form two images when the incoming light ray is away from a horizontal reference plane.

8. The survey level of claim 7 wherein said beam-splitting means includes a Porro prism.